United States Patent [19]

Zimmerman et al.

[11] 3,881,159

[45] Apr. 29, 1975

[54] VOBULATED OSCILLATOR WITH CO-TUNED HARMONIC FILTER HAVING MAGNETICALLY TUNED INDUCTIVE ELEMENTS

[75] Inventors: Róbert Zimmerman; Ferenc Felföldi; Ferenc Makó, all of Szekesfehervar, Hungary

[73] Assignee: Videoton Radio-Es Televiziogyar, Szekesfehervar, Hungary

[22] Filed: Nov. 30, 1973

[21] Appl. No.: 420,675

[30] Foreign Application Priority Data

Feb. 14, 1973 Hungary .............................. VI 915

[52] U.S. Cl. ............... 331/77; 331/117 R; 331/181; 336/155

[51] Int. Cl. ............................................ H03b 5/12

[58] Field of Search ........ 331/117 R, 181, 36 L, 77; 336/30, 155

[56] References Cited

UNITED STATES PATENTS

| | | | |
|---|---|---|---|
| 2,200,263 | 5/1940 | De Kramolin | 336/155 X |
| 2,781,503 | 2/1957 | Saunders | 336/155 X |
| 2,897,352 | 7/1959 | Smith-Vaniz, Jr. | 331/181 X |

FOREIGN PATENTS OR APPLICATIONS

| | | | |
|---|---|---|---|
| 786,569 | 11/1957 | United Kingdom | 331/181 |
| 738,825 | 9/1943 | Germany | 331/36 L |

*Primary Examiner*—Siegfried H. Grimm
*Attorney, Agent, or Firm*—Young & Thompson

[57] ABSTRACT

Arrangement for placing the iron-core of a high frequency coil into the air gap of a premagnetising low frequency (LF) iron-core which can advantageously be used as a frequency determining element in HF vobulated oscillators. The HF core of the HF coil has a closed shape and the magnetic flux lines extend substantially parallel and breakless within said HF core arranged so in the gap of the premagnetising LF iron-core that the plane of said gapless parallel HF flux lines extends substantially parallel to the premagnetising LF flux lines extending through said gap. A plurality of HF coils can be arranged within the gap of the premagnetising LF core, and the co-tuned HF coils can be used in numerous HF circuits. The magnification factor Q of the HF coils is essentially greater than in the conventionally arranged HF coils.

2 Claims, 3 Drawing Figures

Figure 1:
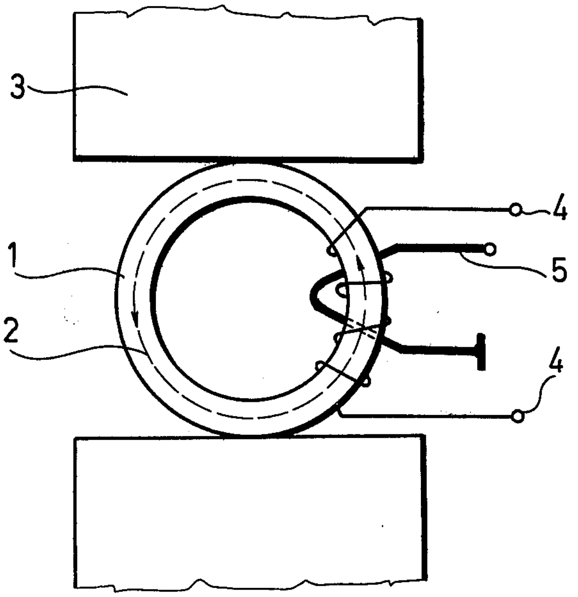

VOBULATED OSCILLATOR WITH CO-TUNED HARMONIC FILTER HAVING MAGNETICALLY TUNED INDUCTIVE ELEMENTS

The invention relates to an arrangement for placing the iron-core of a high frequency (HF) coil into the air gap of a premagnetising low frequency (LF) iron-core, especially for vobulated oscillators, comprising an air gap in the magnetic circuit of the premagnetising LF core, and the HF core is placed within the air gap. The LF core is energised by a premagnetising coil.

The invention has been designed for use in vobulated oscillators comprising semiconductors as active elements which operate with relatively wide frequency deviation ranges, but it can advantageously be used in any kind of HF circuits wherein components with variable inductances are required.

A conventional embodiment of the magnetically biased HF coils comprised a cylindrical solenoid core which was placed within the air gap of the premagnetising LF magnetic circuit. A section of the HF magnetic flux lines of the solenoid penetrated into the LF core of the premagnetising coil establishing an unwanted coupling or link between the HF and LF magnetic circuits. This unwanted coupling represented the most significant disadvantage of this known embodiment because the premagnetising core was generally built of a ferrite material having a relatively great permeability factor and a low upper limiting frequency, and this coupling increased therefore the losses of the HF coil decreasing so its magnification factor Q.

A further disadvantage of the above conventional embodiment was indicated by the fact that the magnetic field of the secondary HF coil, which was adapted to pull out the energy of the first HF coil, was coupled both with the outer and with the inner magnetic field of the solenoid. The outer and inner magnetic fields had opposite directions and the opposing fields and acted against each other thus decreasing the efficiency of the coupling between the primary and the secondary HF coils.

The HF coils with relatively low magnification factors caused a great harmonic content in the signals of the oscillators using these coils and the great harmonic content represented a further disadvantage of the above described known embodiment.

This problem appeared to be serious especially at higher values of the frequency scanning ratios (e.g. when the ratio of the maximal and minimal frequency within the same range was 2:1 or more), and in these cases harmonic attenuation exceeding 30 dB could not be attained.

The low harmonic content has great significance both at the output level control of the vobulators and at the rejection of the false measurements. It is therefore the aim of the researches in this field to improve the harmonic suppression of the vobulated oscillators. The complexity and the cost of the means which have improved harmonic suppression properties, rapidly increase with the extent of this improvement.

It is an object of the invention to produce a HF coil arrangement with magnetically tuned variable inductance, in which the extent of the coupling between the HF magnetic flux lines and the LF premagnetising core is essentially less than it is in the conventional arrangements.

A further object of the invention is to produce a HF coil arrangement with variable inductivity wound around a ferrite core having gapless magnetic flux lines and minimal stray inductance.

A still further object of the invention is to produce a magnetically tuned variable inductance HF coil arrangement which can advantageously be used in vobulated oscillators to improve their harmonic suppression properties and which can be used in the harmonic filter circuits of these oscillators as well.

These and other objects are attained with the invention in which the HF coil is wound around a closed HF iron core and the HF magnetic flux lines extend substantially parallel, continuously and breakless along said HF core, and this HF core is so arranged in the gap of a premagnetising iron core that the plane of the closed parallel HF flux lines extends substantially parallel to the premagnetising LF flux lines extending through said gap. The closed HF iron core can preferably be a ferrite core having ring or toroid shape.

When the HF coil of the above arrangement is connected to the frequency determining circuit of a conventionally built HF oscillator, the great magnification factor of said coil increases the amplitude of the oscillator and increases the maximal value of the frequency scanning ratio while, decreasing the harmonic content of the output signal.

For the purpose of attaining a more effective harmonic suppression a plurality of these coils can be arranged within the air gap of said LF premagnetising core and one of these coils is connected to the frequency determining circuit of the oscillator, while the other coils are adapted in the harmonic filter circuit connected in series with the output of said oscillator. The plane of the closed HF core containing the oscillator coil should be arranged substantially normal to the plane of the other cores to minimize the unwanted coupling among these coils. The energy of the oscillators can be coupled by means of a coupling secondary coil wound around the same HF core containing the oscillator coil.

Figure 2:
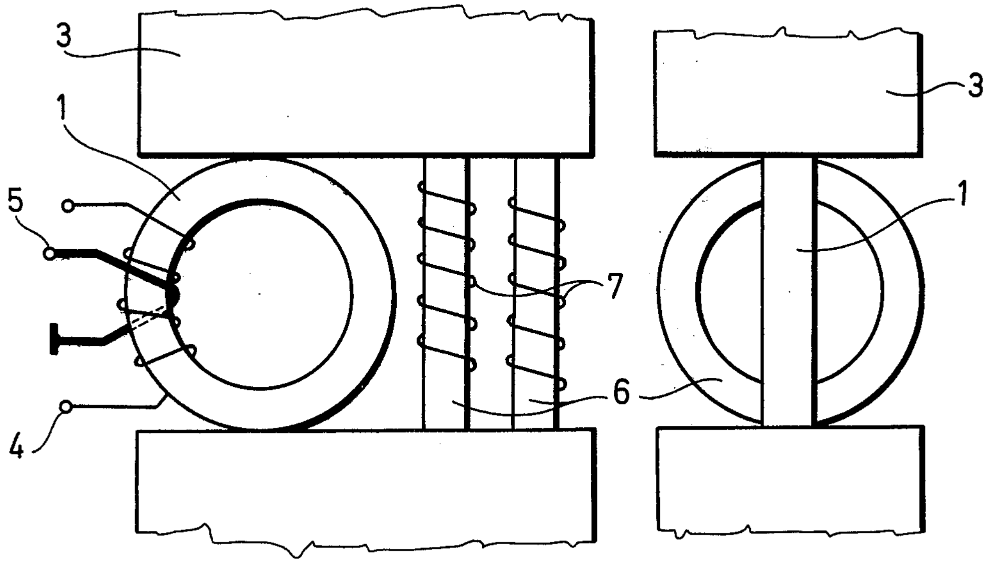
Figure 3:
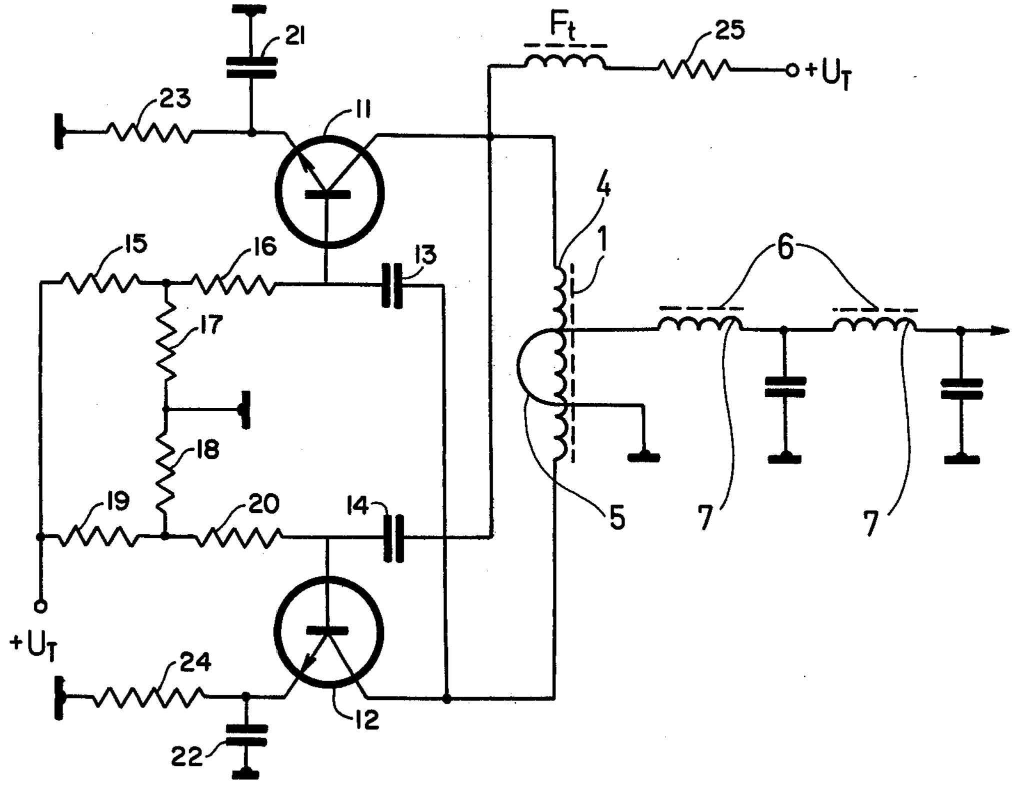

The invention will now be further described on the basis of the attached drawings illustrating by way of example a preferred embodiment of the invention. In the drawings:

FIG. 1 is a schematic elevation view of the LF and HF cores according to the invention, FIG. 2 is a schematic front and side elevation view of a premagnetising core having a plurality of HF coils in the gap, FIG. 3 is a schematic circuit diagram of a HF oscillator using the coil arranged according to the invention.

The premagnetising circuit shown schematically in FIG. 1 comprises an iron core 3 made of ferrite material having low upper limiting frequency and the core 3 has preferably a rectangular cross-section. The core 3 is energised by a coil (not shown) connected to a suitable source. The magnetic circuit of the core is broken by an air gap. The energised core 3 induces a substantially homogenous magnetic field within the gap having LF magnetic flux lines extending normal to the cross sectional surface of the gap.

FIG. 1 shows a HF coil 4 wound around a ring-shaped HF iron core 1 situated in such a position within the air gap of the premagnetising LF core 3, that the axis of the ring-shaped core 1 is normal to the premagnetising LF magnetic flux lines. The width of the air gap corresponds to the outer diameter of the ring-shaped HF core 1.

When the HF coil is energised with a suitable HF voltage, magnetic flux lines 2 are induced in the HF core 1 having a closed circular path which are coaxial with the contour line of the ring. A coupling secondary coil 5 is also wound around the HF core 1 dimensioned so as to meet the matching conditions of the loading impedance of the circuit.

When the inducing magnetic field of the core 3 is varied, it alters the premagnetisation of the HF core 1 changing this way the value of its reversible permeability. The reversible permeability change of the HF core 1 results in a change in the inductivity of the HF coil 4. It can be seen therefore that the magnetisation of the LF core 3 controls the inductivity of the HF coil 4, but at the same time the closed HF magnetic flux lines 2 of the HF coil 4 neither touch nor penetrate into the LF core 3.

FIG. 2 shows an arrangement comprising a plurality of HF coils wound around respective similar ring-shaped HF cores and placed within the air gap of the core 3. Based on their closed flux lines the coils have only small stray magnetic fields. The undesired magnetic coupling among these coils can further be decreased by arranging the axes of the rings into a mutually normal position. The axes of the core 1 of the HF coil 4 are therefore turned by 90° (as shown in FIG. 2.) with respect to the axes of the similar ring-shaped cores 6 of the coils 7.

FIG. 3 discloses a conventional oscillator circuit or so-called balance generator. In this circuit two transistors 11 and 12 are provided. The collector of the first transistor 11 is connected through a feedback capacitor 14 to the base of the second transistor 12, while the collector of this latter is connected via a second feedback capacitor 13 to the base of the first transistor 11.

The DC-operating point of the two transistors is determined by a known balanced dividing network comprising six resistors 15, 16, 17, 18, 19 and 20. The two emitters are connected through resistors 23, 24 to the ground, respectively. The high frequency component of the emitter voltage is shunted by using two grounded bypass capacitors 21, 22. A frequency determining resonance circuit consisting of the biased coil 4 and of the circuit stray capacitances is disposed between the collectors of said two transistors. The collector voltage is fed to the coil 4 through a HF choke Ft connected in series with a resistor 25.

The operation of this known oscillator circuit is as follows:

Adjacent the resonance-frequency of the resonance circuit the phase difference between the two end points of this circuit becomes equal to 180° and this produces a positive feedback between the two mutually coupled transistors. As a result of this positive feedback a high frequency oscillation occurs, while the frequency of this oscillation is determined by the inductance of the coil 4.

The harmonic content of the vobulated signals can further be suppressed by connecting a low-pass filter into its output circuit. As the frequency scanning ratio of the vobulator may be 2:1 or more, the second upper harmonic of the oscillator which is to be suppressed, may fall within a possible other operating frequency. A very effective harmonic suppression can be obtained, if the inductivities of the low-pass filter are realised by coils arragned according to the invention and if these coils are placed into a premagnetising magnetic field varying the same way as the premagnetizing magnetic field wherein which the coil 4 of the oscillator is situated. In the illustrated embodiment of the invention the coils 7 of the low-pass filter are wound around the HF cores 6 and these cores 6 along with the coils 7 are arranged in the air gap of the LF core 3 as shown in FIG. 2. The upper turnover frequency of the low-pass filter falls within a possible operating frequency if the actual oscillator frequency is near to the lowest edge of the band, but if the oscillator frequency is increased (by changing the premagnetising field in the core 3), the turnover frequency of the low-pass filter will also be increased.

The low pass filter illustrated in FIG. 3 comprises only two inductive and capacitive members. It must be understood, however, that the invention is not restricted to these members and any appropriate filter can be used in which the frequency shift caused by the appropriate premagnetizing of the inductive filter coils extends the turnover frequency of said filter over the upper limit of the operating frequency range.

In a preferred embodiment shown in FIG. 3 the upper harmonic suppression have been measured as more than 40 dB everywhere within a vobulated frequency range between 40–110 Mc/s.

The arrangement according to the invention can be used not only in vobulated oscillators but in every circuit where a good quality HF coil is required that has magnetically variable inductivity.

What we claim is:

1. Vobulated oscillator arrangement including a frequency determining resonance circuit, comprising an inductive member wound around a ring-shaped high frequency ferrite core in the air gap of a premagnetizing low frequency iron core, the axis of said HF ferrite core being substantially normal to the premagnetizing flux lines extending through said air gap, and a harmonic filter circuit coupled to the output of said oscillator, said filter circuit having inductive elements wound around ring-shaped high frequency ferrite cores in the air gap of said premagnetizing iron core, the energization of the premagnetizing iron core being effective to change the oscillating frequency within a predetermined range and at the same time to extend the upper turnover frequency of said harmonic filter well over the second harmonic frequency of said oscillator.

2. Arrangement as claimed in claim 1, the axis of the high frequency core of the high frequency coil which is connected to the oscillator circuit being substantially normal to the axes of the other ring-shaped high frequency cores within said air gap.

* * * * *